Sept. 19, 1961  H. W. DIETERT ET AL  3,000,065
END POINT MOISTURE CONTROL FOR SOLID GRANULAR MATERIAL
Filed Jan. 20, 1958  2 Sheets-Sheet 1

INVENTORS
HARRY W. DIETERT
RANDOLPH L. DIETERT
BY Whittemore,
Hulbert & Belknap
ATTORNEYS INVENTORS
HARRY W. DIETERT
RANDOLPH L. DIETERT
BY
Whittemore
Hulbert & Belknap
ATTORNEYS United States Patent Office 3,000,065
Patented Sept. 19, 1961

3,000,065
END POINT MOISTURE CONTROL FOR SOLID GRANULAR MATERIAL
Harry W. Dietert and Randolph L. Dietert, Detroit, Mich., assignors to Harry W. Dietert Co., Detroit, Mich., a corporation of Michigan
Filed Jan. 20, 1958, Ser. No. 710,147
17 Claims. (Cl. 22—89)

The present invention relates to end point moisture control for solid granular material such for example as foundry sand.

It is an object of the present invention to provide an automatic system for adding water to granular material in a mill, mixing the material and water, sensing the moisture content of the material, and preventing termination of the addition of water which might result from sensing a moist sample of sand in the mill while the average moisture content is below that required.

It is a further object of the present invention to provide a system for adding water to granular material such as sand in a mixer in which the addition of water is controlled by the instantaneous and increasing moisture content of the sand resulting from the addition of water thereto and to a temperature of the sand.

More specifically, it is an object of the present invention to provide a system as set forth in the preceding paragraph in which the controlling sand temperature is determined in a hopper prior to dumping into the mill, and in which means are provided for locking in the temperature reading at the beginning of the cycle.

It is a further object of the present invention to provide a system as set forth in the second paragraph above in which the sand temperature is determined in the mixer and is accordingly variable in accordance with the addition of water to the sand.

It is further object of the present invention to provide a system as described in the preceding paragraph in which the temperature responsive means includes a temperature variable resistance element exposed in a wall of the mixer to the moist sand therein.

It is a further object of the present invention to provide a system as set forth in the preceding paragraph in which a moisture sensitive element and a temperature sensitive element are exposed within the mixer to the moist granular material therein, said elements being electrically connected.

Other objects and features of the invention will become apparent as the description proceeds, especially when taken in conjunction with the accompanying drawings, illustrating preferred embodiments of the invention; wherein.

Figure 1:
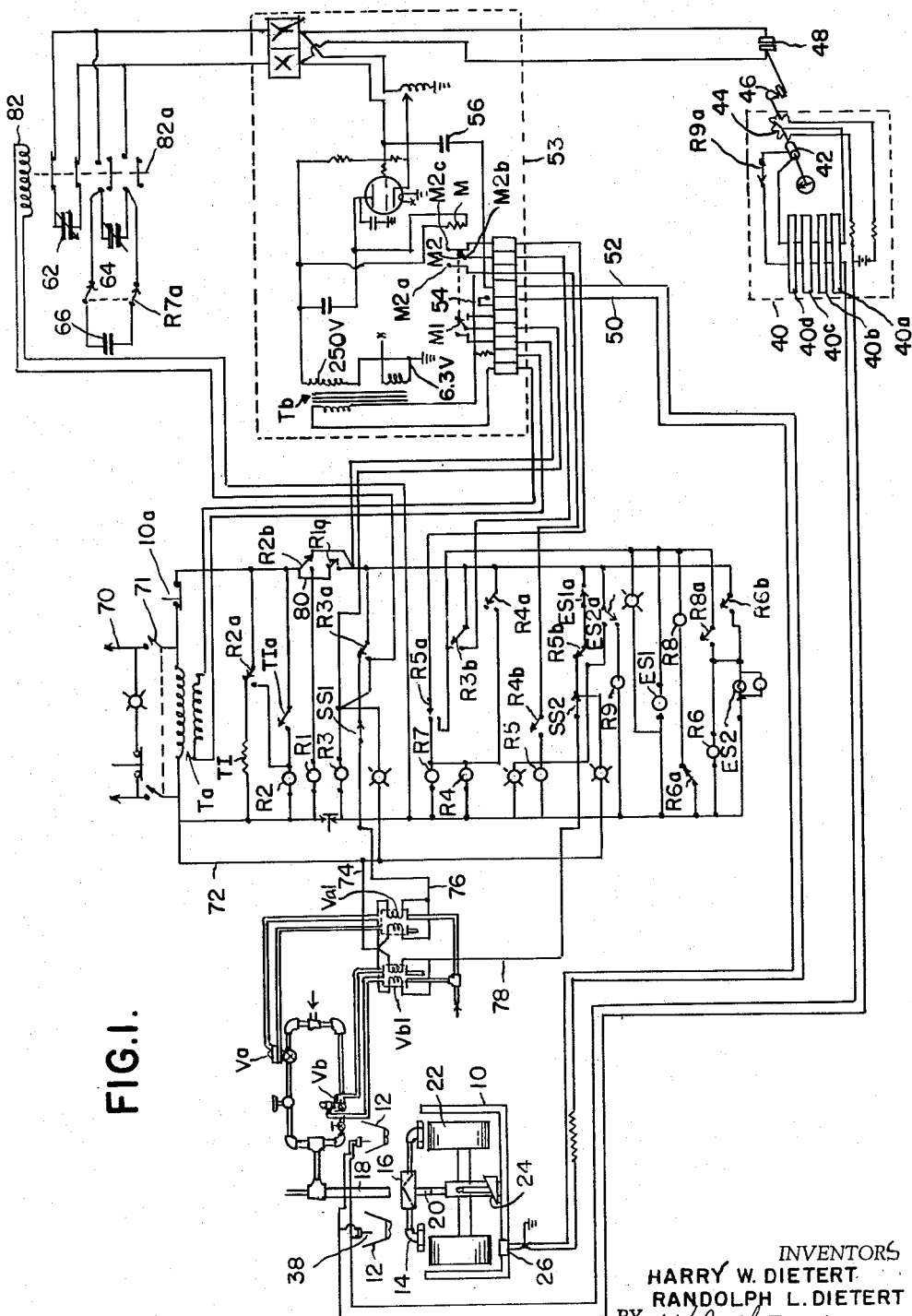
FIGURE 1 is a diagrammatic view of a system in accordance with the present invention.

As seen in FIGURE 1, there is provided a sand mill or mixer 10 adapted to receive sand from one or a plurality of hoppers 12, and water is added to the sand in the mill through sprinklers 14 connected to a receptacle 16 which receives water from a pipe 18. The sprinklers are illustrated as supported by a vertical shaft 20 which serves as drive means for the relatively heavy rollers 22.

In FIGURE 1 the sprinklers 14 appear as directly above the rollers 22, but in practice they are preferably circumferentially spaced therefrom.

The sand mill 10 is of the type including the relatively heavy rollers previously referred to, and in addition to the rollers there is provided a plow or plows 24 having a leading edge spaced only slightly above the bottom wall of the mill and adapted to scrape the sand therefrom after it has been compacted by the rollers 22.

Located in the bottom wall of the mill is a moisture probe 26 which includes a conducting element separated by a predetermined distance from grounded conducting elements. A probe of this type is disclosed in detail in our prior copending application Serial No. 671,221, and will not be further described except to note that the moisture sensitive element of the probe is connected by a shielded conductor to the electrical control system, as will later be described.

As the heavy rollers pass over the probe a specimen of moist sand is firmly compressed against the conducting plate or element of the probe and a maximum moisture reading is thus obtained. After the reading has been obtained the compressed specimen is removed from the probe by the succeeding plow 24. Actually, while the plow does not contact the bottom wall of the mill nor engage the moisture sensitive surface of the probe, the plow is effective to remove all or substantially all of the compressed material from the surface of the probe.

In addition to the moisture sensitive probe, means are provided for measuring the temperature of the sand in the hoppers 12 before it is added to the mill. For this purpose thermocouples indicated diagrammatically at 38 are provided in position to contact sand in the hopper. The thermocouples herein shown as two in number are connected in parallel to a potentiometer indicated generally at 40 including a converter 40a, input transformer 40b, voltage amplifier 40c, and power amplifier 40d. The latter is connected to a motor 42 which in turn is connected to the movable arm 44 of a rheostat and to a cam 46. Dependent on the voltage applied by the thermocouples, the motor 42 rotates to move the arm 44 of the rheostat to the position required to balance the temperature signal. The corresponding rotation of the cam 46 effects adjustment of an adjustable capacitor 48.

The moisture probe 26 is connected by line 52 to a moisture measuring bridge indicated at 53 which is a measuring instrument identified as a Tektor Unit #101, manufactured and sold by the Fielden Instrument Division of the Robertshaw-Fulton Controls Company. The line 50 represents a grounded shielding for the conductor 52, the ground connection being indicated at 54. The line 52 is connected through a high capacity capacitor 56 to instrument connector X. The variable capacitor 48, actuated in accordance with the temperature of the sand in the hopper before it is dumped into the mill, is connected to the instrument connection X and also to a second instrument connection Y. The instrument connection X is connected to the grid of a vacuum tube, for example a 6SN7 tube, connected as shown to have its output applied to a relay coil M which actuates switch contact arms M1 and M2. Also connected to the instrument connections are an adjustable first point capacitor 62 and an adjustable end point capacitor 64. The end point capacitor 64 is connected in parallel with a high capacity, as for example 2000 M.M.F., fixed capacitor 66, by normally closed contacts R7a of a relay R7 later to be described.

Described in general terms, the system operates as follows: The operator momentarily opens a switch 10a which by conventional circuit connections (not shown) operates to release dump doors on the hoppers 12 and to dump the sand therein into a mill. If desired, this may also start rotation of the shaft 20 driving the rollers 22 in the mill to mix the sand therein. As will subsequently appear, momentary opening of the switch 10a breaks a circuit to the motor 42 and hence, the capacitor 48 will remain in the position corresponding to the temperature of the sand in the hoppers just prior to initiation of a mixing and moistening cycle.

It is ordinarily desirable to allow substantial mixing of the sand before attempting to determine its moisture, since sand of different moisture content may be dumped into the mill from different hoppers.

After a predetermined interval of mixing, operation of the moisture control device is initiated and water is added through the pipe 18. A timer is started which will insure rechecking the moisture content after a predetermined interval even though the instrument may previously have indicated sufficient moisture. This is because of the possibility of a false reading and rechecking after a predetermined interval will insure continued operation of the instrument until the average moisture content of the mixture is adequate.

During operation of the instrument, a first point valve Va and an end point valve Vb are both opened and water is supplied to the sand while it continues to be mixed. Inasmuch as the mixing operation comprises the passing of the rollers 22 over the moisture probe 26, followed almost immediately by passage of the plow 24, it will be appreciated that even when the sand reaches the required moisture content, this correct moisture content will be indicated only at intervals determined by the passage of the rollers 22 over the probe. After the scraper or plow 24 has passed over the probe, the sensing system will indicate a moisture deficiency until the succeeding sample of moist sand is compressed against the probe.

At this time it is desired to add the water rapidly to bring the moisture content approximately up to but definitely somewhat below the desired value. Accordingly, at this time control of the instrument is by the first point capacitor 62 and the temperature compensating capacitor 48. Eventually, the instrument senses the proper moisture content for a brief interval and the system is arranged at this time to close the large capacity first point valve Va and to shift control of the instrument to the combination of the three capacitances, the end point capacitance 64, the temperature compensating capacitance 48, and the modifying capacitance 66. Capacitance 66 is a large value capacitance, for example 2000 M.M.F., which is sufficient to stop the 6SN7 tube from oscillating and in turn de-energize the relay M causing contact M2 to connect contact M2b to contact M2c and complete a circuit through contact R5a to energize relays R7 and R4, thus taking capacitance 66 out of the circuit at contact R7a for the remainder of the cycle, leaving the control of the instrument to the sum of the end point capacitance 64 and temperature compensating capacitance 48. Thereafter, water continues to be added to the mill at a reduced rate by the end point valve Vb until the first indication of the ultimate desired moisture is obtained. It is recognized however, that this first indication may be a false indication resulting from sensing the moisture content of a small specimen not indicative of the true average moisture content of the sand. Accordingly, means are provided at this time to close the end point valve while the mixing of the sand continues. During the following interval moisture readings are taken periodically as the rollers 22 pass over the sand probe. So long as these moisture readings all indicate sufficient moisture the valve Vb remains closed. A timing means is provided to operate over for example three seconds, which prevents opening of the end point valve during the brief intervals between successive sensing operations. For example, re-sensing may occur every two seconds and the timer may be set to time out in three seconds. At the end of two seconds if the sensing of moisture indicates sufficient moisture, the timer is reset to zero.

On the other hand, if during this rechecking interval a moisture sensing operation indicates insufficient moisture, the moisture valve opens and remains open until a second sensing of adequate moisture. This operation continues for an interval determined by an additional timer which operates to terminate the rechecking operation and to maintain the end point valve Vb closed, thus ending the cycle.

When the system is set in operation, the capacities of the moisture probe 26, the temperature responsive capacitor 48, and the first end capacitor 62, are all connected to the instrument connections X, Y. When sufficient moisture has been added to the mill or mixer 10 to increase the capacity of the moisture probe 26 to a required value, the 6SN7 tube will oscillate and will energize the relay coil M.

Oscillation of the 6SN7 tube is dependent upon the algebraic sum of the capacities connected to the instrument connections X and Y.

The addition of water through the discharge pipe 18 is through a first point valve Va which is air controlled and the supply of air controlling the valve is in turn controlled by a winding Val which will subsequently be described. At the same time an end point valve Vb is provided also controlled by air, which in turn is controlled by solenoid Vbl. The arrangement is such that when the solenoids Val and Vbl are energized the corresponding valves are closed. The valves of course are open when the respective windings are de-energized.

The operation of the complete system will be described in connection with the illustrated circuit, which will be described to the extent necessary to understand the system. A 110-volt power line indicated at 70 is connected to the control circuit through a manual control switch 71. The control circuit includes the transformer Ta which is energized whenever the manual switch 71 is closed and which in turn supplies the primary of a second transformer Tb having the 250-volt and 6.3-volt secondary windings illustrated in the Tektor unit 53.

In operation sand is received in the hoppers 12 and its temperature actuates through the thermocouples to drive the motor 42 to position the adjustable capacitor in a position determined by the temperature of the sand in the hopper or hoppers. It will be observed that the circuit includes a relay R9 having normally closed contacts R9a in series with the motor 42. When the switch 10a is momentarily opened a timer contact ES2a drops down to zero position, thus completing a circuit through the relay R9 and opening normally closed contacts R9a, thus terminating operation of the motor 42. The timer contact arm ES2a remains in the downward position throughout the cycle. Accordingly, the addition of water to the sand is in accordance with its temperature prior to initiation of the mixing cycle. This is desirable since the temperature of the mixture is variable with the temperature of the water and best results are obtained when the amount of water is determined in accordance with the initial temperature of the sand. The foregoing phase of the operation may be regarded as a locking in of the temperature responsive means upon initiation of the cycle at a sand temperature determined prior to the mixing operation.

The sand is dumped into the mill 10 without regard to the moisture content thereof. Where sand is dumped in from a plurality of hoppers, some of the sand may be relatively moist and some of it may be relatively dry. Accordingly, the sand which initially contacts the probe may be either too dry or too moist. In order to insure that this condition does not prevent the required addition of water, the control circuit includes timing means operable to provide a cycling of the control system after a predetermined interval irrespective of whether or not the instrument initially cut off the supply of water during the first timed interval. This means comprises a timer resistance TI having a switch arm TIa associated therewith. The switch arm TIa may for example be in the form of a bimetal contact member which is normally open and which closes after the resistance TI has been energized for a substantial period, as for example fifteen seconds. Closure of the manual switch 71 starts heating resistance element TI through contact R2a, the contact being in the illustrated position when the relay R2 is de-energized.

After the predetermined initial period, as for example fifteen seconds, has elapsed, the switch arm TI*a* closes energizing relay R2 and moving relay arm R2*a* to its lower position establishing a holding circuit through the relay R2 and simultaneously de-energizing the timer TI. The relay R2 remains energized for the remainder of the cycle. In addition, energization of relay R2 shifts relay arm R2*b* to the left energizing relay R1. Energization of relay R1 shifts relay arm R1*a* to the left establishing a connection to the lower portion of the circuit through the jumper line 80, around arm R2*b*, which remains to the left, holding relay R1 in. This begins the second phase of the cycle in which moisture in the sand in the mill is effective to exert a control over the circuit.

During the interval measured by the timer TI it may be possible for sufficient water to have been added to the sand and mixed therewith, in which case the operation should be terminated. In other cases a false signal may result in closure of the valves V*a* and V*b*. When the timer TI times out the switch arm R2*b* moves clockwise, thus momentarily breaking the circuit to the lower portion of the system. When the switch arm R2*b* is in its lowermost or clockwise rotated position it energizes relay R1 which closes a circuit through switch arm R1*a*, thus re-energizing the lower portion of the circuit. The interval between energization of relay R2 and the energization of relay R1 is substantial and all circuits completed through portions of the wiring diagram below relay R1 in the figure are de-energized so that all holding circuits drop out. When the switch arm R1*a* completes its movement all circuits are again re-energized and checking of the moisture of the sand is resumed. If in fact, the moisture content of the sand is sufficient this recheck results in quick cycling of the instrument to close the valves V*a* and V*b* and they will remain closed for an interval determined by energization of a timer ES2 later to be described, which finally completes the cycle.

The operation of the system during the interval controlled by the timer TI is exactly the same as it would be if the timer were omitted. The function of the timer is to re-start the complete cycle after a predetermined interval so that additional water can be added if the operation of the system was terminated as a result of a false signal during the first timed interval. A second important function of the initial timing period depends upon the following: It may happen that during the initial timing period a first signal is received from the moisture measuring unit which will have the effect of closing the large capacity valve V*a* and leaving additional water to be supplied through the relatively smaller end point valve V*b*. If the false signal was the result of a small quantity of very moist sand happening to contact the moisture probe, a large volume of water may in fact be required to bring the average moisture content of the sand to the required value. During the initial interval timed by the timer TI, water will be added through the small capacity valve V*b*. However, when the timer TI times out the control circuit is completely de-energized and re-energized, thus starting afresh with the large capacity valve V*a* open and this valve will remain open until the measuring unit makes the first signal indicating adequate moisture, which signal is sometimes referred to as a wet signal.

Assuming that insufficient water has been added to the sand, the rollers and plows continue to rotate and water is now added to the mill through the valves V*a* and V*b*. The solenoid V*al* of the first water valve V*a* is energized through lines 72, 74, 76, selector switch SS1, switch arm R3*a*, switch arm R1*a*, and jumper 80. Energization of solenoid V*al* maintains the first point valve V*a* open. In like manner, the end point valve V*b* and its solenoid V*bl* are energized through lines 72, 74, 78, selector switch SS2, switch arm R5*b*, switch arm ES1*a*, switch arm R1*a*, and jumper 80. The addition of water and mixing of the sand continues concurrently until the moisture content of the sand approaches a value near to but definitely below the final required value. At this time the value of the capacitance of the moist sand as sensed by the moisture probe 26 is such that the various capacitances connected to the points X, Y, including the first point capacitance, operate to cause the 6SN7 tube to oscillate, thereby establishing a current through the relay coil M sufficient to shift the contacts M1 and M2 to the left from the position shown.

Closure of the switch M1 establishes a current through relay R3, switch arm R1*a*, and jumper 80. Energization of the relay R3 moves switch arm R3*a* downwardly from the illustrated position, thus breaking the circuit through the solenoid valve V*al* and closing the first point valve V*a*. Switch arm R3*a* completes a circuit through the relay R3 and through the solenoid 82 of a switch having contacts indicated generally at 82*a*. Energization of solenoid 82 moves the switch contacts 82*a* upwardly, thus disconnecting the first point capacitance 62 and connecting the end point capacitance 64 and the bias capacitance 66 into the circuit. It will be observed that the circuit through the relay R3 is held closed by the switch arm R3*a*, and hence from this time to the end of the cycle, relays R1, R2 and R3 remain closed.

In addition to the foregoing, energization of the relay R3 shifts the switch arm R3*b* downwardly, thus preparing a circuit for subsequent energization of relay R5. This circuit extends from the switch arm R4*b* which is open at this time, to contact M2*a*, contact M2*b*, switch arm R3*b*, switch arm R1*a*, and jumper 80.

Since this first indication of adequate moisture was based upon control of the first point capacitance 62 and the temperature compensating capacitance 48, subsequent passages of the rollers over the moisture probe will not result in indication of adequate moisture until a substantial additional quantity of water has been added through the valve V*b*. Ordinarily, it is preferred to add approximately 80% of the water while the first point valve V*a* remains open, the additional 20% being added at a much slower rate through the smaller end point valve V*b*.

As soon as the scraper has removed the moist specimen of sand from the moisture probe following this first indication, relay coil M is de-energized and contacts M1 and M2 again return to the illustrated position to the right. At this time a circuit is completed through relays R4 and R7, the normally closed switch arm R5*a*, contact M2*c*, contact M2*b*, switch arm R3*b* which is closed by first energization of the relay M, switch arm R1*a*, and jumper 80. Energization of the relay R4 closes switch R4*a* establishing a holding circuit for the relays R4 and R7 which keeps these relays in throughout the balance of the cycle. Energization of the relay R7 opens normally closed contacts R7*a*, thus disconnecting bias capacitance 66 from the circuit and leaving the end point capacitance 64 in control. The operations are continuous without further change until there is a second indication of adequate moisture, which as before energizes the relay coil M and shifts the contacts M1 and M2 to the left. The contact M1 has no further function since it has already energized relay R3 which remains energized through a holding circuit throughout the balance of the cycle. However, movement of the switch arm M2 to connect contacts M2*a* and M2*b* now energizes relay R5 through switch arm R4*b*, contacts M2*a*, M2*b*, switch arm R3*b*, switch arm R1*a*, and jumper 80. Energization of relay R5 shifts switch arm R5*b* to the lower position, thus breaking the circuit to the solenoid V*bl* and closing the end point valve V*b*. This would normally constitute the end of the cycle but additional provision is made for rechecking the moisture content a number of times to insure against premature termination of the cycle while the average moisture content of the sand is below that required.

The brief interval in which the switch arms M1 and M2 are to the left (before the next succeeding passage of the plow 24) has closed the end point valve Vb but downward movement of switch arm R5b has established a holding circuit through the relay R5 which includes switch arm ES1a of a short interval timer ES1. Thus, as long as the switch arm ES1a remains closed the relay R5 will remain energized and the end point valve Vb will remain closed. The motor of the timer ES1 is at this time energized through the switch arm R5a, contacts M2c and M2b, switch arm R3b, switch arm R1a, and jumper 80. The timer ES1 may be set for an interval, for example of three seconds, and after three seconds the switch arm ES1a will open if the timer is permitted to run its course. However, during the three seconds in which the timer ES1 is timing out, there will be a subsequent sensing of moisture content and if the moisture content of the sand is adequate, relay M is momentarily energized and switch arm M2 will interconnect contacts M2a and M2b briefly, and then return to interconnect contacts M2b and M2c. This will have the effect of breaking the circuit to the motor of timer ES1 at the contact M2c and return of the switch arm M2 to the contact M2c will re-start the timer for timing out the same interval. Thus, so long as the periodic moisture sensing operations sense adequate moisture, the timer will be automatically re-started so that the timer contact arm ES1a will never open and the relay R5 will remain energized through the switch arm R5b, switch arm ES1a, switch arm R1a, and jumper 80. This will interrupt the circuit through the solenoid Vbl at switch arm R5b and the end point valve will remain closed. If however, passage of a roller 22 over the moisture probe gives a dry signal, there will be sufficient time for the timer ES1 to time out, causing opening of the timer switch arm ES1a and breaking the circuit to the relay R5, thus restoring switch arm R5b to its illustrated position. This will complete the circuit through the solenoid Vbl and re-open the end point valve Vb. The end point valve Vb will remain open until a subsequent sensing of moisture content indicates the correct value thereof at which time the end point control valve will close and re-checking will resume. The timer motor ES1 is re-started and switch arm ES1a closed when the relay R5 is next energized by the next wet signal.

In order to terminate the cycle after a predetermined interval which may be devoted to rechecking, a longer interval timer ES2 is provided having contacts ES2a in a branch circuit connecting the relay R5 across the lines. Thus, when the switch arm ES2a is closed, the relay R5 remains energized, switch arm R5b remains in its lower position, thus interrupting the circuit to the solenoid Vbl and finally terminating the cycle.

Energization of a longer interval timer which finally terminates the cycle is initiated through normally closed switch arm R6a, relay R8, switch arm R5a, contact M2c, contact M2b, switch arm R3b, switch arm R1a, and jumper 80. Energization of the relay R8 closes switch arm R8a, thus energizing the relay R6 which in turn closes switch arm R6b, establishing a holding circuit through relay R6 and opening switch arm R6a. The continued energization of relay R6 and closure of switch arm R6b maintains the motor of timer ES2 energized for a predetermined interval upon termination of which, timing out of the timer closes switch arm ES2a, thus establishing a circuit through the relay R5 and moving switch arm R5b downwardly from the illustrated position to break the circuit to solenoid Vbl. This finally closes the end point control valve Vb if it was then open and marks the end of the cycle.

Figure 2:
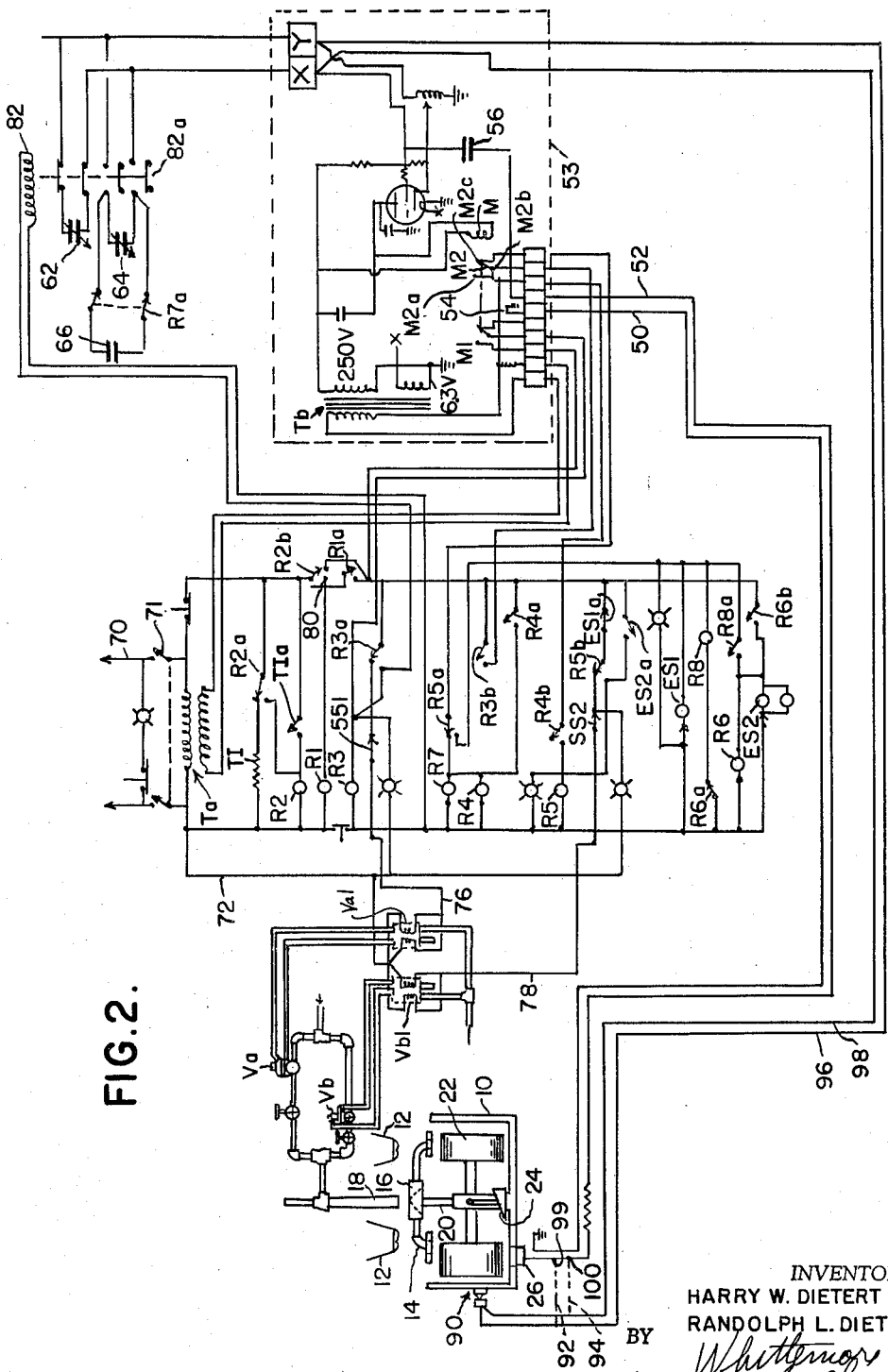
FIGURE 2 is a view similar to FIGURE 1 of a somewhat modified system.

Referring now to FIGURE 2, the same branch circuit is illustrated and will not again be described in detail. In this case however, instead of providing thermocouples in the hoppers 12, a temperature sensitive resistance element is provided in the wall of the mill which is responsive to the temperature of the sand as it is mixed. This temperature sensitive element may be in the form of a thermistor which gives a negative response, decreasing the value of the resistance upon increase in temperature, or it may be in the form of a resistance bulb which increases its resistance upon an increase in temperature. If the temperature sensitive element indicated at 90 has a positive temperature coefficient as in the case of a resistance bulb, it may be connected in series to the probe by conductors indicated in lines at 92 and 94, respectively, and breaking line 52 at points 99 and 100. If, however the temperature responsive resistance has a negative temperature coefficient, it is connected as indicated by the full lines 96 and 98, which connect to the Tektor unit connections X, Y.

In this case it will be observed that the control grid of the 6SN7 tube in the Tektor unit is biased by the combination of a variable capacity and variable resistance connected in series or parallel dependent upon whether the resistance has a positive or negative coefficient. With properly selected values for the moisture probe and temperature responsive resistance, the control unit may be set to produce precisely the required moisture content in the sand for foundry use. As explained, the system definitely prevents accidental termination of the mixing cycle before sufficient moisture has been added and thus insures that in all cases a precisely prepared molding sand is made available.

By providing the temperature sensitive resistance as the temperature indicator it is possible to eliminate the unit 40 whose function is to convert the output of one or a plurality of thermocouples to a corresponding setting of a variable capacitance. This of course requires employing a continuous reading of the sand temperature which may vary as it is mixed with water. In the embodiment of the invention illustrated in FIGURE 1 the temperature control is affected in accordance with initial sand temperature.

The drawings and the foregoing specification constitute a description of the improved end point moisture control for solid granular material in such full, clear, concise and exact terms as to enable any person skilled in the art to practice the invention, the scope of which is indicated by the appended claims.

What we claim as our invention is:

1. Automatic apparatus for producing a required moisture content in granular material which comprises a mixer, valve means controlling the addition of liquid to the mixer, a hopper for receiving granular material prior to placement in said mixer, an automatic valve control system comprising temperature responsive means responsive to temperature in said hopper, moisture responsive means in said mixer, means for locking in said temperature responsive means at the value determined just prior to initiating a mixing cycle, and means responsive to initial temperature and increasing moisture content to close said valve means.

2. Apparatus as defined in claim 1 in which said temperature responsive means comprises a temperature responsive device in said hopper, an adjustable capacitance, a motor for adjusting said capacitance, a circuit including said device connected to said motor, and means responsive to initiation if a mixing cycle for opening the circuit to said motor whereby addition of liquid is dependent on the temperature of the material prior to mixing.

3. Automatic apparatus for producing a required moisture content in granular material which comprises a mixer, valve means controlling the addition of liquid to the mixer, a hopper for receiving granular material prior to placement in said mixer, a dump door for dumping material from said hopper to said mixer, an automatic valve control system comprising temperature responsive means responsive to temperature in said hopper, moisture responsive means in said mixer, means for releasing said dump door and initiating a mixing cycle, means operable automatically upon initiation of a mixing cycle for locking in the temperature responsive means at the value prevailing upon dumping of material into said mixer, and means responsive to initial temperature and increasing moisture content to close said valve means.

4. Apparatus for tempering granular material which comprises a mixer including means therein for mixing granular material and liquid, liquid addition means for adding liquid directly to said mixer during operation thereof, said liquid addition means comprising a shut-off valve, temperature measuring means for measuring the temperature of the granular material, moisture measuring means for measuring the increasing moisture content of granular material in the mixer during operation thereof and addition of liquid thereto, means operatively connected to said temperature and moisture measuring means and to said valve to close said valve to terminate addition of liquid to said mixer upon attainment of a moisture content in said granular material appropriate for the measured temperature thereof, control means for said mixer to effect continued operation thereof after closure of said valve, and timing means operable a predetermined interval after initial liquid addition effective to condition said apparatus for reopening of said valve and continued liquid addition until the appropriate moisture content is measured for a second time to avoid inadvertent final valve closure by measurement of appropriate moisture content in a small sample of granular material while its average moisture content is deficient, said measuring means being operative to effect final valve closure upon a later measurement of appropriate moisture content.

5. The apparatus as defined in claim 4 in which the temperature measuring means is located in the mixer.

6. Apparatus as defined in claim 5 in which the temperature measuring means includes a temperature variable resistance.

7. Apparatus for tempering granular material which comprises a mixer including means therein for mixing granular material and liquid, liquid addition means for adding liquid directly to said mixer during operation thereof, said liquid addition means comprising a shut-off valve, temperature measuring means for measuring the temperature of the granular material prior to the additon of any liquid thereto, moisture measuring means for measuring the increasing moisture content of granular material in the mixer during operation thereof and addition of liquid thereto, means operatively connected to said temperature and moisture measuring means and to said valve to close said valve to terminate addition of liquid to said mixer upon attainment of a moisture content in said granular material appropriate for the measured temperature thereof, control means for said mixer to effect continued operation thereof after closure of said valve, and timing means operable a predetermined interval after initial liquid addition effective to condition said apparatus for reopening of said valve and continued liquid addition until the appropriate moisture content is measured for a second time to avoid inadvertent final valve closure by measurement of appropriate moisture content in a small sample of granular material while its average moisture content is deficient, said measuring means being operative to effect final valve closure upon a later measurement of appropriate moisture content.

8. Apparatus for tempering granular material which comprises a mixer including means therein for mixing granular material and liquid, liquid addition means for adding liquid directly to said mixer during operation thereof, said liquid addition means comprising a first point valve and end point valve, temperature measuring means for measuring the temperature of the granular material, moisture measuring means for measuring the increasing moisture content of granular material in the mixer during operation thereof and addition of liquid thereto, means operatively connected to said temperature and moisture measuring means and to said valves to close said first point valve upon attainment of moisture content near to but below the final required moisture content and to close said end point valve upon attainment of a moisture content in said granular material appropriate for its measured temperature, control means for said mixer to effect continued operation thereof after closure of said valves, and timing means operable a predetermined interval after initial liquid addition effective to condition said apparatus for reopening of both of said valves and continued liquid addition until the appropriate moisture content is measured for a second time to avoid inadvertent final valve closure by measurement of appropriate moisture content in a small sample of granular material while its average moisture content is deficient, said measuring means being operative to effect final valve closure upon a later measurement of appropriate moisture content.

9. Apparatus as defined in claim 8 in which the temperature measuring means is located in the mixer.

10. Apparatus as defined in claim 9 in which the temperature measuring means includes a temperature variable resistance.

11. Apparatus for tempering granular material which comprises a mixer including means therein for mixing granular material and liquid, liquid addition means for adding liquid directly to said mixer during operation thereof, said liquid addition means comprising a shut-off valve, temperature measuring means for measuring the temperature of the granular material, moisture measuring means for measuring the increasing moisture content of granular material in the mixer during operation thereof and addition of liquid thereto, means operatively connected to said temperature and moisture measuring means and to said valve to close said valve to terminate addition of liquid to said mixer upon attainment of a moisture content in said granular material appropriate for the measured temperature thereof, control means for said mixer to effect continued operation thereof after closure of said valve, and retest means for measuring the moisture content of the granular material following valve closure and operable to reopen said valve if the measured moisture content of said granular material falls below the appropriate value during continued mixing.

12. Apparatus as defined in claim 11 in which the temperature measuring means is located in the mixer.

13. Apparatus as defined in claim 12 in which the temperature measuring means includes a temperature variable resistance.

14. Apparatus as defined in claim 11 in which the moisture measuring means operates at short intervals, and in which the retest means includes the moisture measuring means and an interval timer having an interval longer than the measuring interval, means connecting said interval timer to said valve to reopen said valve if said interval timer times out, and means connecting said moisture measuring means to said interval timer to reset said interval timer to zero upon each measurement by said moisture measuring means of appropriate moisture content for the measured temperature of the granular material.

15. Apparatus as defined in claim 14 which comprises additional timing means, means for starting said additional timing means simultaneously with first closure of said end point valve, said additional timing means comprising means for preventing further reopening of said end point valve to finally terminate a tempering cycle.

16. Apparatus for tempering a granular material, which comprises a mixer for receiving the granular material having mixing means therein, liquid supply means including an electrically actuated end point valve for supplying liquid directly to the granular material in said mixer during operation of the mixing means, a cycle control system comprising temperature measuring means for measuring the temperature of the granular materials, moisture measuring means for measuring the moisture content of the granular material in the mixer during addition of liquid thereto and continued mixing thereof, and a plurality of relays operable in a predetermined sequence from a cycle start position, connections between said measuring means, said relays and said electrically actuated valve operable to close said valve when said measuring means senses a moisture content appropriate for the measured temperature, recycling means connected to said control system and operable to reset said relays to cycle start position, and timing means connected to said recycling means operable to actuate said recycling means a predetermined interval after first initiation of a cycle, to eliminate the effect of a false moisture measurement due to a wet spot in the granular material.

17. Apparatus as defined in claim 16 in which the temperature measuring means is in the mixer.

References Cited in the file of this patent

UNITED STATES PATENTS

| 2,709,843 | Hartley | June 7, 1955 |
| 2,825,946 | Dietert et al. | Mar. 11, 1958 |
| 2,848,008 | Dietert et al. | Aug. 19, 1958 |

FOREIGN PATENTS

| 621,181 | Great Britain | Apr. 15, 1949 |

OTHER REFERENCES

Transactions of the American Foundrymen's Society, Volume 62 (1954), pages 19–21.